(12) United States Patent
Stachewicz et al.

(10) Patent No.: US 10,777,856 B2
(45) Date of Patent: Sep. 15, 2020

(54) SAFETY SENSOR MODULE WITH VEHICLE COMMUNICATION TO FIRST RESPONDERS

(71) Applicant: Dura Operating, LLC, Auburn Hills, MI (US)

(72) Inventors: Aaron Brion Stachewicz, Troy, MI (US); Cumhur Ünveren, Commerce Township, MI (US); Indraneel Krishna Page, Rochester Hills, MI (US)

(73) Assignee: DURA OPERATING, LLC, Auburn Hills, MI (US)

( * ) Notice: Subject to any disclaimer, the term of this patent is extended or adjusted under 35 U.S.C. 154(b) by 63 days.

(21) Appl. No.: 15/626,692

(22) Filed: Jun. 19, 2017

(65) Prior Publication Data

US 2018/0366792 A1 Dec. 20, 2018

(51) Int. Cl.
| | |
|---|---|
| *H01M 10/48* | (2006.01) |
| *B60Q 5/00* | (2006.01) |
| *B60Q 1/52* | (2006.01) |
| *H01M 2/10* | (2006.01) |
| *B60L 58/10* | (2019.01) |
| *B60L 3/00* | (2019.01) |
| *B60L 50/64* | (2019.01) |

(52) U.S. Cl.
CPC ......... *H01M 10/488* (2013.01); *B60L 3/0007* (2013.01); *B60L 3/0046* (2013.01); *B60L 50/64* (2019.02); *B60L 58/10* (2019.02); *B60Q 1/52* (2013.01); *B60Q 5/005* (2013.01); *H01M 2/1083* (2013.01); *H01M 10/482* (2013.01); *H01M 10/484* (2013.01); *B60L 2250/10* (2013.01); *H01M 2200/00* (2013.01); *H01M 2220/20* (2013.01)

(58) Field of Classification Search
None
See application file for complete search history.

(56) References Cited

U.S. PATENT DOCUMENTS

| | | |
|---|---|---|
| 4,798,968 A | 1/1989 | Deem |
| 5,034,620 A | 7/1991 | Cameron |
| 6,599,656 B2 | 7/2003 | Cittanova |
| (Continued) | | |

FOREIGN PATENT DOCUMENTS

| | | |
|---|---|---|
| CN | 102064364 A | 5/2011 |
| JP | 1999219732 A | 3/2002 |
| (Continued) | | |

*Primary Examiner* — Daniel S Gatewood
(74) *Attorney, Agent, or Firm* — Vivacqua Crane PLLC (57) ABSTRACT

A battery pack safety system for a battery powered vehicle includes a vehicle battery pack having at least one battery cell positioned in a bay of a frame. Multiple sensors are each supported by the frame. A safety module in communication with each of the multiple sensors collects an output of each of the sensors for transmission to a vehicle computer unit. A safety module power supply provides backup power for operation of the multiple sensors and the safety module when an electrical charge of the battery pack is unavailable. A warning module is in communication with the safety module. The warning module when initiated by a signal from the safety module in response to an output signal generated by any of the multiple sensors energizes a signaling device providing external vehicle indication of a status of the battery pack.

7 Claims, 6 Drawing Sheets

(56) References Cited

U.S. PATENT DOCUMENTS

| | | | |
|---|---|---|---|
| 7,339,774 B2 | 3/2008 | Zdziech et al. | |
| 7,511,456 B2 | 3/2009 | Lee et al. | |
| 7,521,817 B2 | 4/2009 | Gors | |
| 8,307,934 B2 | 11/2012 | Rini et al. | |
| 8,846,232 B2 | 9/2014 | Tse | |
| 8,884,459 B2 | 11/2014 | Smith et al. | |
| 9,208,670 B2 | 12/2015 | Krieg et al. | |
| 9,248,746 B2 | 2/2016 | Wen | |
| 2012/0150393 A1* | 6/2012 | Knight-Newbury | B60L 3/04 701/45 |
| 2013/0181826 A1* | 7/2013 | Yang | H01M 10/4228 340/455 |
| 2017/0008402 A1 | 1/2017 | Thomas et al. | |

FOREIGN PATENT DOCUMENTS

| | | | | |
|---|---|---|---|---|
| JP | 2002289262 A | 10/2002 | | |
| JP | 2007200880 A | 8/2007 | | |
| JP | 2008535174 A | 8/2008 | | |
| JP | 2010153117 A | 7/2010 | | |
| WO | 2009011749 A1 | 1/2009 | | |
| WO | 2016077117 A1 | 5/2016 | | |
| WO | WO-2016077117 A1 * | 5/2016 | | H01M 2/1258 |

\* cited by examiner

SAFETY SENSOR MODULE WITH VEHICLE COMMUNICATION TO FIRST RESPONDERS

FIELD

The present disclosure relates generally to vehicle system condition sensing and vehicle system condition transmission systems, including emergency responder signaling.

BACKGROUND

The statements in this section merely provide background information related to the present disclosure and may or may not constitute prior art.

Automobile vehicles including electric vehicles and hybrid vehicles providing at least partial propulsion from battery power create unique conditions that must be considered due to the energy and fluid in the battery packs provided with the vehicle when the vehicle is disabled or in an accident. A first responder such as a fire truck or tow vehicle which approaches a battery and hybrid powered vehicle needs to take action to discharge the battery pack to reduce possible spark and fire conditions. Known battery and hybrid powered vehicle battery packs are accessible via a power charging connection, however this connection may not be available to a first responder after a collision or other accident.

The battery packs of known battery powered and hybrid or battery-engine powered vehicles, hereinafter collectively referred to as "battery powered" vehicles, also do not provide a common communication system to collect all battery pack sensor output which is then made available to the vehicle operator and outside of the vehicle such as to first responders.

Thus, while current vehicle battery pack systems achieve their intended purpose, there is a need for a new and improved system and method for collecting.

SUMMARY

According to several aspects, a battery pack safety system for a battery powered vehicle includes a safety module in communication with a vehicle battery pack holding an electrical charge. At least one battery pack sensor is in communication with the safety module. A warning module in communication with the safety module, the warning module when initiated by a signal from the safety module energizing a signaling device providing external vehicle indication of a status of the battery pack.

In another aspect of the present disclosure, the battery pack includes a frame mounted to the vehicle, the at least one battery pack sensor supported by the frame.

In another aspect of the present disclosure, the frame includes a low point for gravity collection of a fluid.

In another aspect of the present disclosure, the at least one battery pack sensor defines one of a moisture sensor or a battery fluid sensor located at the low point.

In another aspect of the present disclosure, the at least one battery pack sensor defines an impact sensor.

In another aspect of the present disclosure, the at least one battery pack sensor defines a smoke sensor.

In another aspect of the present disclosure, the at least one battery pack sensor defines a battery fluid sensor.

In another aspect of the present disclosure, the at least one battery pack sensor includes an accelerometer.

In another aspect of the present disclosure, the at least one battery pack sensor includes at least one of a moisture sensor, an impact sensor, and a smoke sensor, wherein an output from the safety module is in communication with a vehicle electronics control unit in direct communication with the warning module.

In another aspect of the present disclosure, the frame includes multiple bays each containing a battery cell, each of the bays having a low point for gravity collection of a fluid; and the at least one sensor defines multiple moisture sensors each located at the low point of one of the multiple bays.

According to several aspects, a battery pack safety system for a battery powered vehicle includes a safety module in communication with a battery pack holding an electrical charge. Multiple battery pack sensors are in communication with the safety module. A safety module power supply provides backup power for operation of the multiple battery pack sensors and the safety module when the electrical charge of the battery pack is unavailable. A warning module is in communication with the safety module. The warning module when initiated by a signal from the safety module in response to an output signal being generated by any of the multiple battery pack sensors energizes a signaling device providing external vehicle indication of a status of the battery pack.

In another aspect of the present disclosure, the battery pack includes a frame mounted to the vehicle, the frame having multiple sides, the multiple battery pack sensors including impact sensors individually mounted to one or more of the multiple sides of the frame.

In another aspect of the present disclosure, the battery pack includes multiple bays each having a battery cell, and wherein the frame includes a low point with one of the multiple battery pack sensors defining a fluid sensor positioned at the low point.

In another aspect of the present disclosure, the warning module is in communication with at least one of a headlight and a taillight of the vehicle.

In another aspect of the present disclosure, the warning module operates the at least one of the headlight and the taillight of the vehicle in an on-off pattern indicative of a condition of the battery pack.

In another aspect of the present disclosure, the warning module is in communication with a sound generating device of the vehicle.

In another aspect of the present disclosure, the warning module operates the sound generating device in a pattern indicative of a condition of the battery pack.

According to several aspects, a battery pack safety system for a battery powered vehicle includes a vehicle battery pack having at least one battery cell positioned in a bay of a frame. Multiple sensors are each supported by the frame. A safety module in communication with each of the multiple sensors collects an output of each of the sensors for transmission to a vehicle central computer unit. A safety module power supply provides backup power for operation of the multiple sensors and the safety module when an electrical charge of the battery pack is unavailable. A warning module is in communication with the safety module. The warning module when initiated by a signal from the safety module in response to an output signal generated by any of the multiple sensors energizes a signaling device providing external vehicle indication of a status of the battery pack.

In another aspect of the present disclosure, the at least one battery cell defines multiple battery cells each independently positioned in a bay of the frame.

In another aspect of the present disclosure, the multiple battery pack sensors include at least one of each of a moisture sensor or a battery fluid sensor determining a level of a fluid in the battery pack, an impact sensor determining a strain loading applied to the frame, and a smoke sensor determining if smoke is present within the battery pack.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
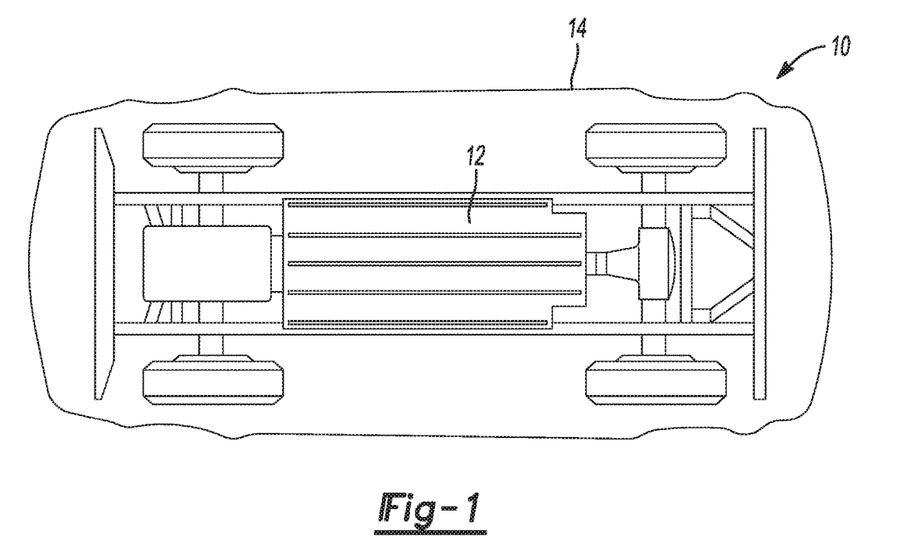
FIG. 1 is rear left perspective view of an automobile vehicle having a battery pack safety system for a battery powered vehicle according to an exemplary embodiment.

Referring to FIG. 1, a vehicle battery safety sensor system 10 is incorporated with with a battery unit or battery pack 12 mounted to a vehicle 14. The battery pack 12 provides an electrical charge as the sole power to propel the vehicle 14, or may provide supplemental power in addition to an engine (not shown).

Referring to FIG. 2 and again to FIG. 1, the vehicle battery safety sensor system 10 together with the battery pack 12 are supported using a structural unit or frame 16 made for example from one or more materials such as a metal including aluminum, or a combination of materials such as a metal and a polymeric material or a composite material. The frame 16 may provide one or more mounting flanges 18 to connect the frame 16 to structure of the vehicle 14. As shown in FIG. 3, the frame 16 has four side walls 16a-16d. The vehicle battery safety sensor system 10 further includes a stranded energy discharge module 20 permitting battery cell discharge in the event of an accident, and a battery emergency response module 22 which can provide signals locally or remotely for a vehicle and a battery emergency condition. The vehicle battery safety sensor system 10 further includes a safety module 24 which will be described in greater detail below.

Figure 2:
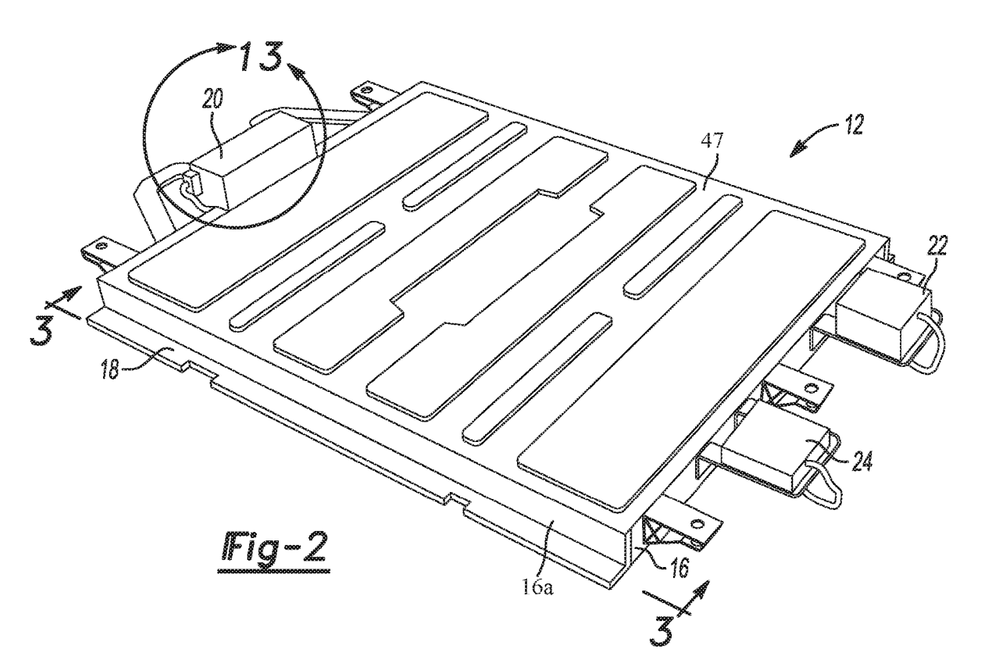
FIG. 2 is a top left perspective view of a battery pack of the present disclosure.
Figure 3:
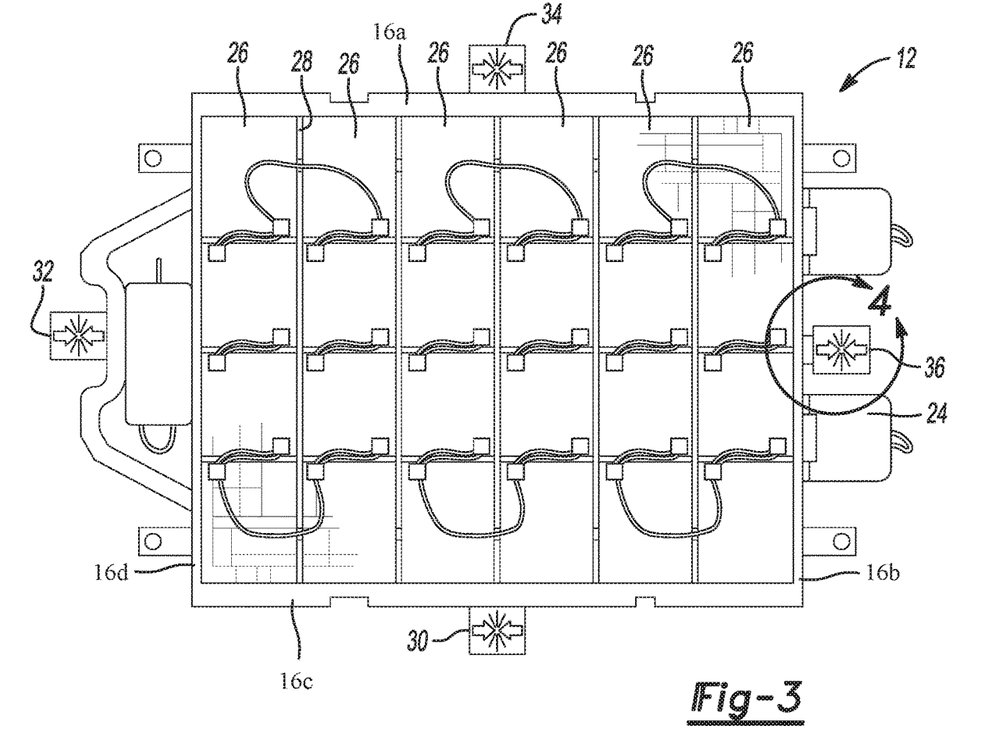
FIG. 3 is a cross sectional top plan view taken at section 3 of FIG. 2.

Referring to FIG. 3 and again to FIG. 2, the battery pack 12 includes at least one and according to several aspects multiple battery cells 26. Each successive pair of the battery cells 26 may be separated by a dividing barrier or cross beam 28 that extends between two of the four side walls 16a-16d. In further aspects, the battery cells 26 are not separated by cross beams, but are positioned in an open cell space. According to several aspects, the vehicle battery safety sensor system 10 provides at least one and according to several aspects multiple sensors connected to the frame 16 supporting the battery pack 12, including at least one impact sensor connected to one of the walls of the frame 16, or may include multiple impact sensors each connected to one or more of the walls of the frame 16, such as a first impact sensor 30, a second impact sensor 32, a third impact sensor 34 and a fourth impact sensor 36. According to several aspects, one impact sensor such as the first impact sensor 30 is mounted to one of the side walls. According to further aspects, one of the first, second, third, and fourth impact sensors 30, 32, 34, 36 is individually mounted to each one of the side walls of the battery pack 12, to provide sensed impact values for each side of the battery pack 12. An output from the impact sensor or sensors, such as from each of the first, second, third, and fourth impact sensors 30, 32, 34, 36 is communicated to the safety module 24. Each of the impact sensors may be provided in the form of an accelerometer or a strain gage.

According to several aspects, the one or more impact sensors provide an output signal in response to a predefined structural loading applied to the frame 16. For example, when multiple impact sensors are provided, an output signal from any single one of the impact sensors may indicate a localized impact and damage to the area of the frame 16 where that impact sensor is mounted. An output from the impact sensors can be cumulatively collected as well. For example, a first predefined cumulative level of strain or impact energy may trigger an impact sensor output signal indicating damage less than total may require repair to the frame 16. Similarly, a second predefined cumulative level of strain may trigger an impact sensor output signal indicating a failure of the frame 16 has occurred.

Figure 4:
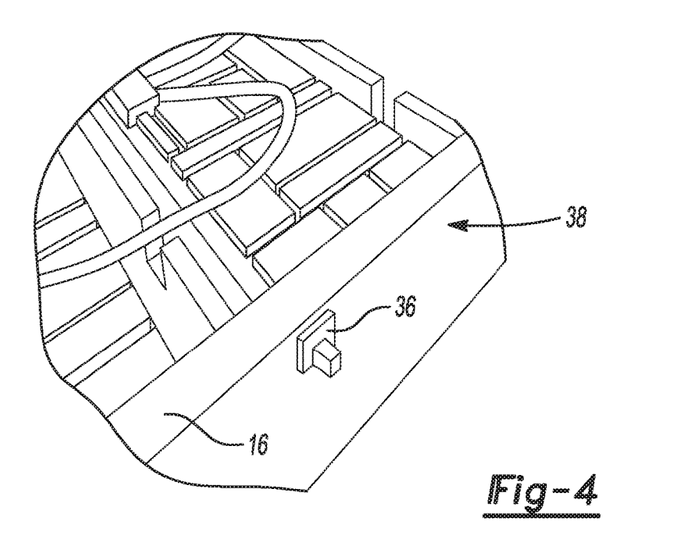
FIG. 4 is a top perspective view of area 4 of FIG. 3.

Referring to FIG. 4 and again to FIG. 3, each of the impact sensors such as the exemplary fourth impact sensor 36 is mounted to an outer facing wall 38 of the frame 16. The impact sensors can also be positioned differently than shown and therefore about any desired position of the frame 16.

Referring to FIG. 5 and again to FIG. 2, the frame 16 of the battery pack 12 may include a single large battery cell bay or may include multiple battery cell bays such as an exemplary battery cell bay 38 which may be bounded between successive cross beams 28, such as between cross beams 28(1), 28(2). In order to collect any fluid leakage that may occur from the battery cells, and also to collect any moisture such a water that may enter the battery pack 12, each of the battery cell bays 38 can include a low point 40. Moisture or battery fluid entering the battery cell bays 38 collects at each low point 40 and is sensed by a moisture sensor 42 such as a water or battery fluid sensor positioned at the low point 40. When fluid is present and triggers an output signal, the output signal from each of the multiple moisture sensors 42 is communicated to the safety module 24. If desired, a particular battery cell bay 38 wherein one of the moisture sensors 42 triggers may be identified by the vehicle battery safety sensor system 10 of the present disclosure. Flow direction arrows 44 indicate a general flow direction of fluid toward the moisture sensors 42 from one side of the frame 16, and oppositely directed flow arrows 45 indicate a general flow direction of fluid toward the moisture sensors 42 from an opposite side of the frame 16. Although the moisture sensors 42 are depicted positioned substantially in a central location of each of the battery cell bays 38, the low points 40, and therefore the position of the moisture sensors 42 can be moved toward either side of the frame 16 from those shown.

Figure 5:
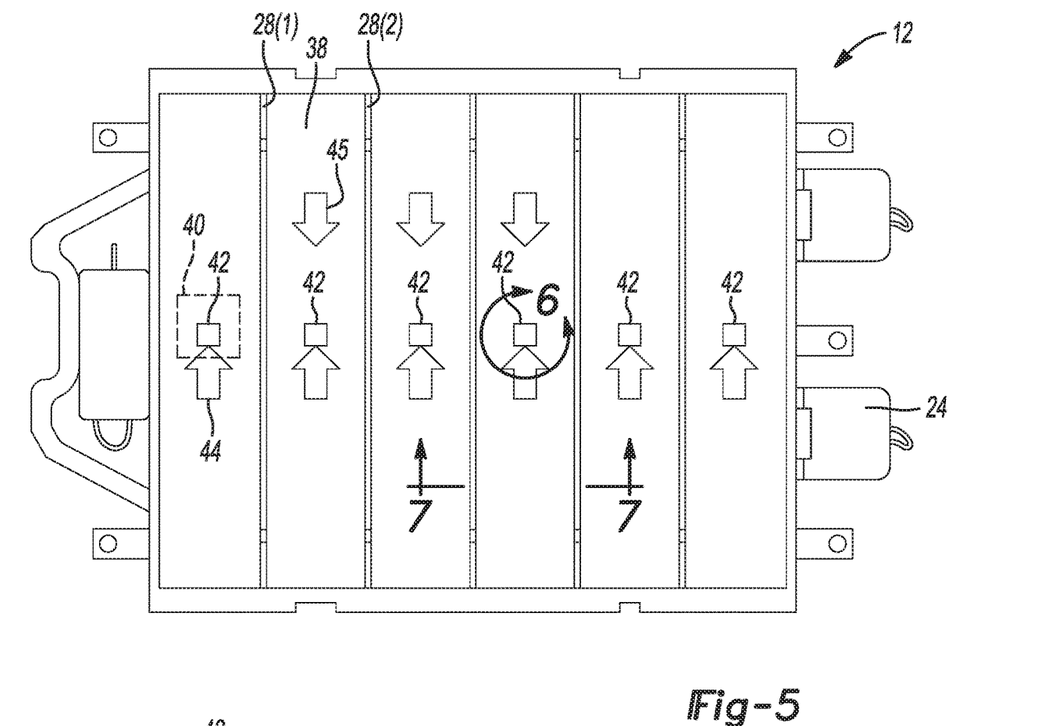
FIG. 5 is a cross sectional top plan view similar to FIG. 3.

Referring to FIG. 6 and again to FIG. 5, each of the moisture sensors 42 can be a singular sensor, or according to several aspects can be provided as a double sensor 46 as shown. The use of double sensors 46 provides redundancy and an increased accuracy in the sensed moisture level.

Figures 6, 7:
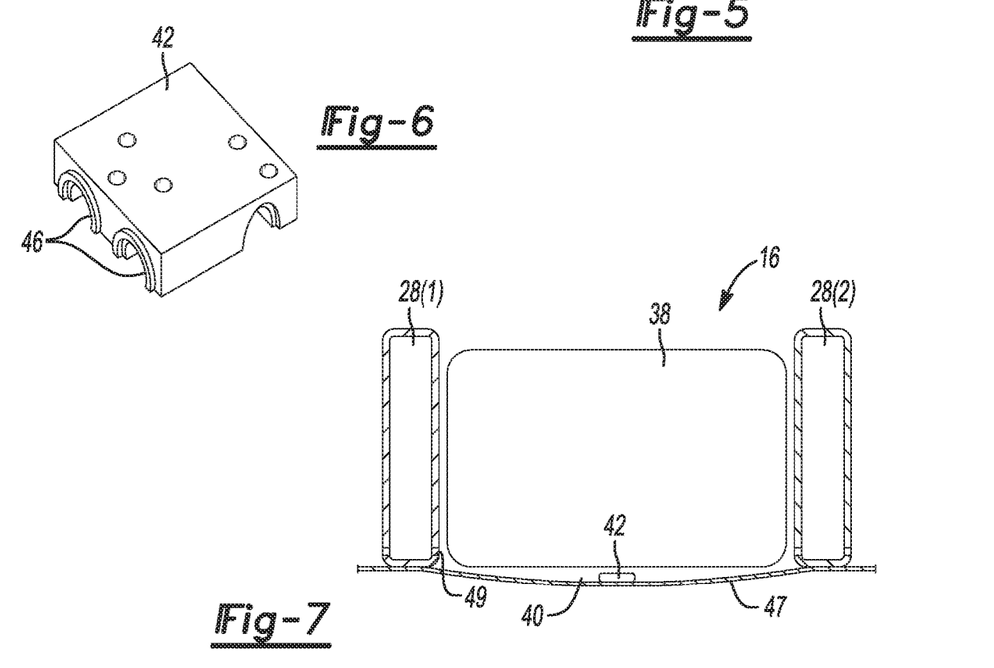
FIG. 6 is a top left perspective view of area 6 of FIG. 5.
FIG. 7 is a cross sectional front elevational view taken at section 7 of FIG. 6.
Figure 13:
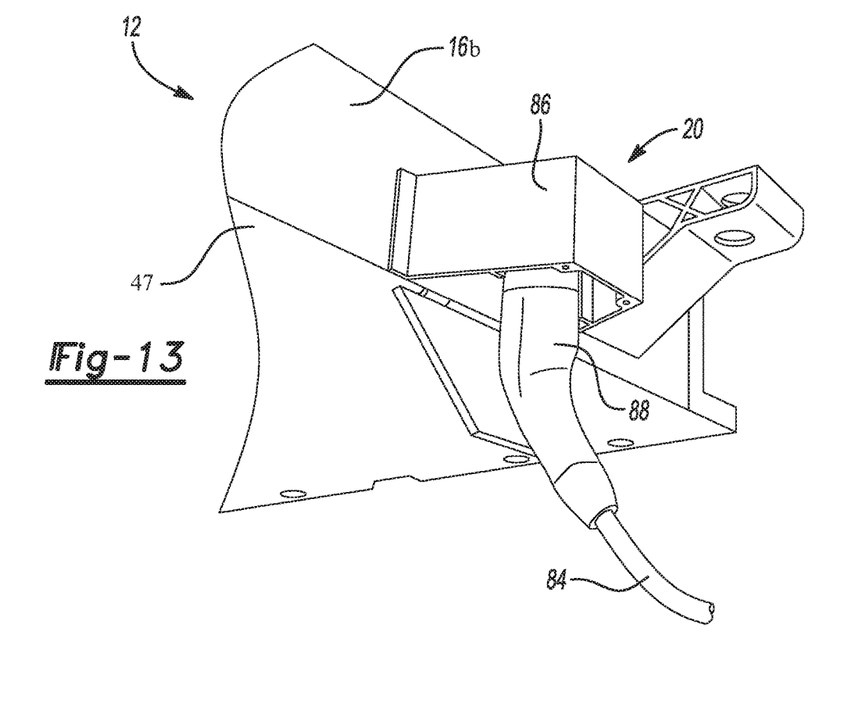
FIG. 13 is a bottom perspective view of area 13 of FIG. 2.

Referring to FIG. 7 and again to FIGS. 5 and 6, a bottom wall 47 of the frame 16 can be curved or pitched downwardly from each of successive ones of the cross beams 28, such as between cross beams 28(1), 28(2) toward the centrally located low point 40. As best seen in FIGS. 2 and 13, the bottom wall 47 is connected to the four side walls 16a-16d of the frame 16. The low point 40 can also be positioned to the left or to the right of the low point 40 as shown in FIG. 7 as desired, as well as toward or away from the viewer. According to several aspects a single low point 40 can also be provided for the entire frame 16, with weep holes 49 allowing fluid flow through each of the cross beams 28 to allow all fluid to collect in the single low point 40, and with a common pitch of the battery pack 12 such as at a one degree downward angle that aids in the flow of liquid to the low point 40.

Figure 8:
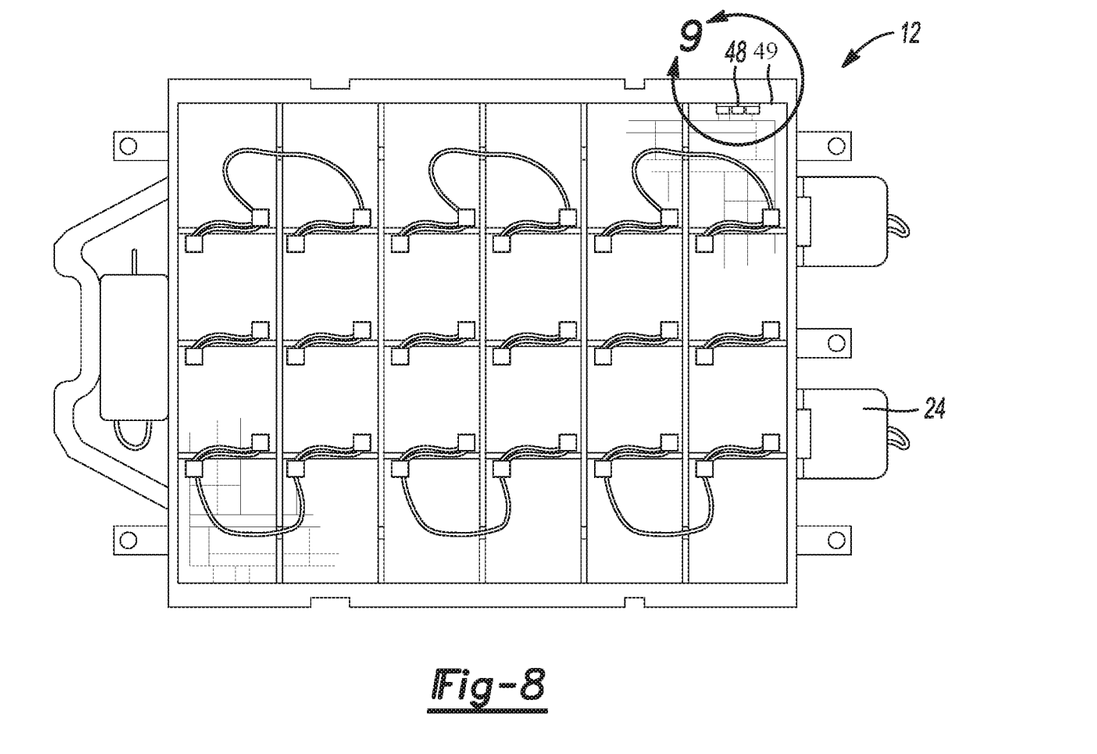
FIG. 8 is a cross sectional top plan view similar to FIG. 3.
Figure 9:
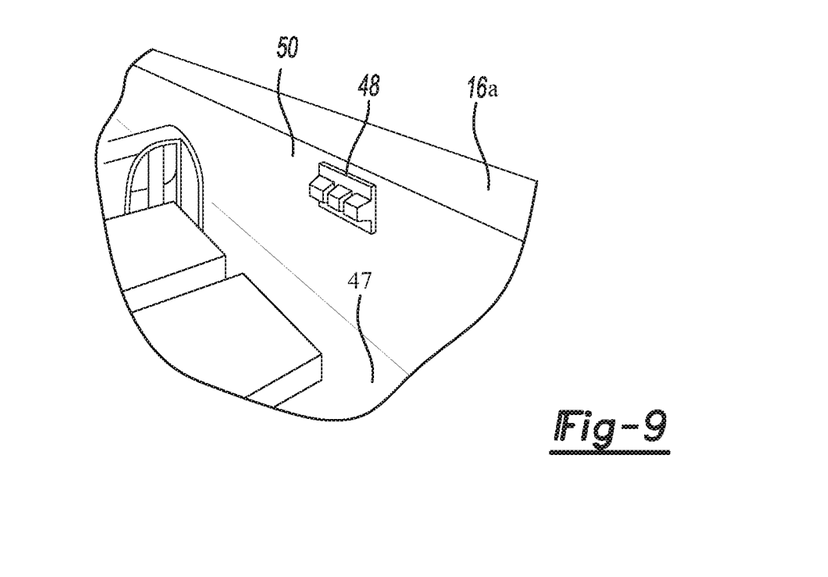
FIG. 9 is a top left perspective view of area 9 of FIG. 8.

Referring to FIGS. 8 and 9, and again to FIGS. 2 and 3, the vehicle battery safety sensor system 10 can further include one or more smoke sensors 48. The smoke sensors 48 can detect heat or smoke, and can be mounted to an inside wall surface 50 of the side wall 16a, for example at opposing inside corners 49 of the frame 16. As shown in FIG. 9, the smoke sensor 48 is spaced above the bottom wall 47. The output signal from each of the multiple smoke sensors 48 is communicated to the safety module 24.

Figure 10:
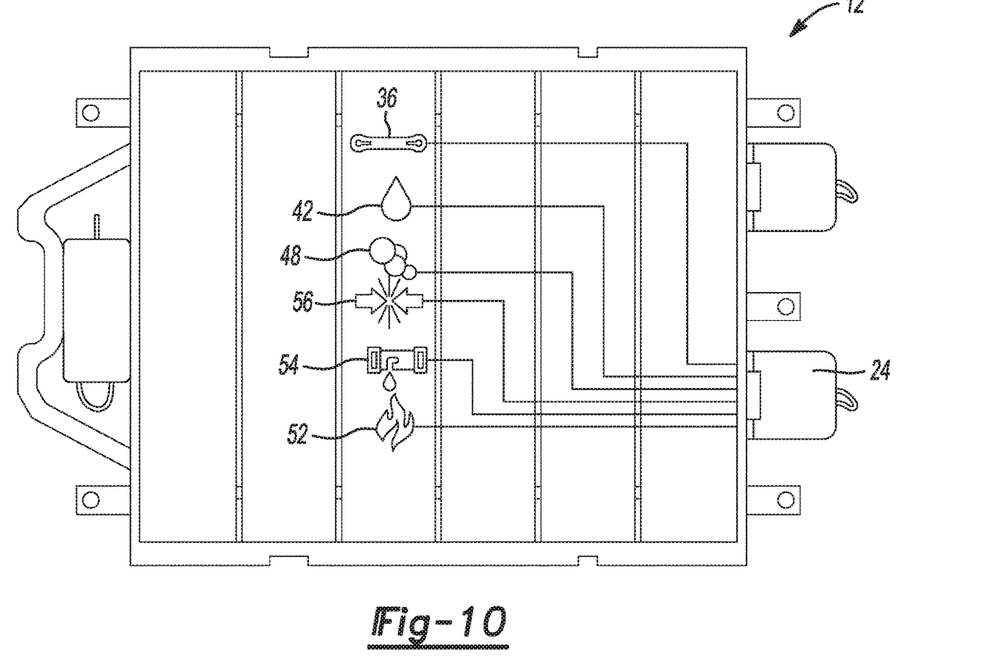
FIG. 10 is a cross sectional top plan view similar to FIG. 3.

Referring to FIG. 10 and again to FIGS. 2 through 9, in addition to the above noted one or more of the first, second, third, and fourth impact sensors 30, 32, 34, 36, the moisture sensors 42, and the smoke sensors 48, the vehicle battery safety sensor system 10 can further include one or more of each of a combination fire and smoke sensor 52, at least one battery fluid leak sensor 54 and at least one accelerometer 56. The output signals from all of the sensors of the battery pack 12 are communicated to the safety module 24.

Referring to FIG. 11 and again to FIGS. 1 through 10, an exemplary diagram of the vehicle battery safety sensor system 10 of the present disclosure includes the safety module 24 in communication with all of the sensors. The safety module 24 may provide computational capability and therefore may include features such as a memory including an EEPROM 58. The safety module 24 receives the output signals from each of the multiple sensors such as the first, second, third, and fourth impact sensors 30, 32, 34, 36, the moisture sensors 42, the battery fluid leak sensors 54, and the accelerometers 56 and coordinates an output signal indicating a condition of the battery pack 12 and the frame 16. The safety module 24 is in communication with a vehicle main computer such as an electronic control unit (ECU) 60 via a high speed CAN interface 62. A connector 64 is provided with the safety system 10 providing power and communication terminals, including a high speed CAN 66 and a low speed CAN 68 for communication with the ECU 60. A safety module power supply 70 is also connected via the connector 64 to a positive power terminal 72 and a ground terminal 74, thereby providing backup power for operation of the safety module 24 if power from the battery pack 12 is unavailable.

Figure 11:
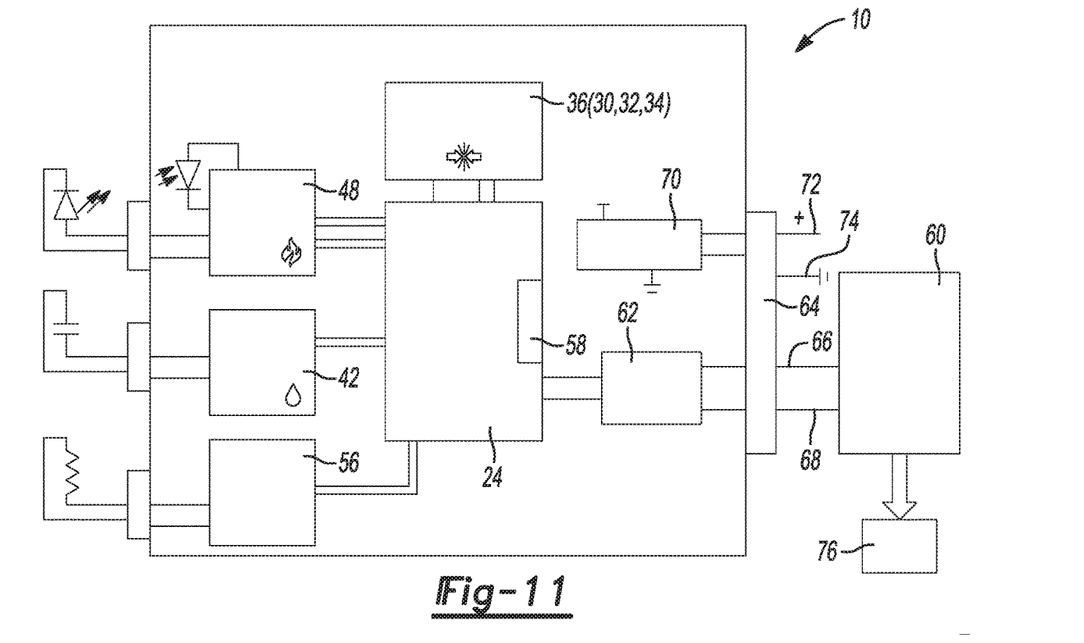
FIG. 11 is a diagrammatic presentation of the battery pack safety system for a battery powered vehicle according to an exemplary embodiment.

A warning module 76 is also in communication with the vehicle ECU 60, such that when a signal is forwarded by the safety module 24 to the vehicle ECU 60 the vehicle ECU 60 may energize any one or all of multiple different vehicle external warnings, including sounding of a vehicle horn or a separate sound emitting device in a pattern indicative of a condition of the battery pack 12 such as a rapid on-off sounding of the horn, flashing of either or both of the vehicle headlights or rear tail-lights in a pattern indicative of a condition of the battery pack 12 such as a predetermined on-off sequence, a remote signal sent via a wireless signal device, an internal message directed to the operator of the vehicle 10 such as a text message indicating the condition of the battery pack such as for example a smoke condition or structural damage to the frame 16, and the like can be initiated in the event of an output signal being transmitted from any one of the sensors of the vehicle battery safety sensor system 10. The warning module 76 is in communication with the safety module 24, such that the warning module 76 when initiated by a signal from the safety module 24 energizes a signaling device described in reference to FIG. 12 providing external vehicle indication of a status of the battery pack 12.

Referring to FIG. 12 and again to FIGS. 1 and 11, if the vehicle 14 is in an accident or damage occurs to the frame 16, the vehicle battery safety sensor system 10 using the safety module 24 forwards signals from the various sensors to the vehicle ECU 60, which determines based on a condition of the vehicle 14 whether to provide external visual indication of the vehicle condition to a first responder by energizing operation of a signaling device such as but not limited to vehicle lights 78 such as the headlights and taillights. A predetermined pattern of light operation such as for example by blinking three times can indicate smoke in the battery pack 12 or a battery fire, or by blinking four times can indicate a battery leak. The signaling device can also define an external audible indication of the vehicle condition which can be provided by operation of a sound emitting device or vehicle horn 80. A first responder can also provide a stranded energy discharge device 82 and an energy discharge cable 84 which may be used to discharge the stored energy charge of the battery pack 12. Signals from the safety module 24 can be transmitted even in the event that the power supply from the 12 VDC battery pack 12 is cut by a first responder in an emergency.

Figure 12:
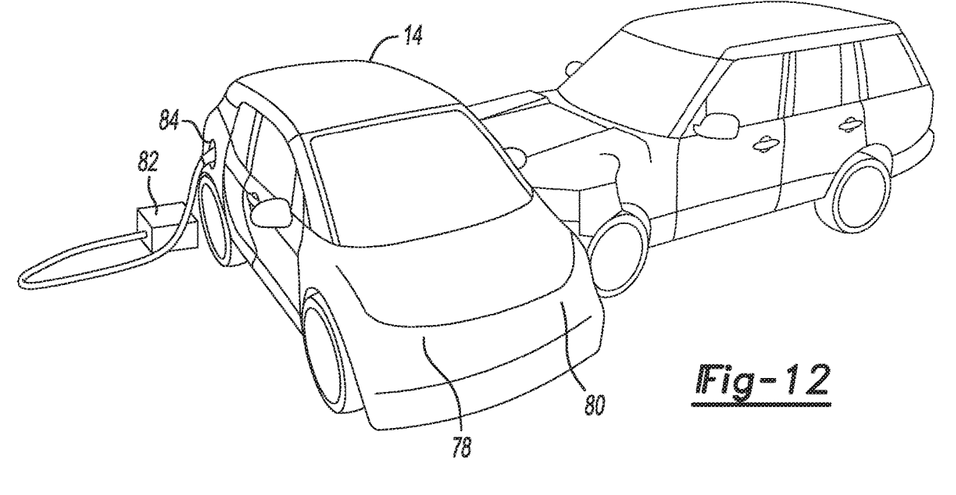
FIG. 12 is a front perspective view of the vehicle of FIG. 1.

Referring to FIG. 13 and again to FIGS. 3 and 12, because it must be assumed the battery pack 12 holds a charge, the stranded energy discharge module 20 of the battery pack 12 includes a power discharge port 86 which can be connected to the multiple battery cells 26 of the battery pack 12 via a passage created through the frame 16. Energy from the multiple battery cells 26 of the battery pack 12 can be bled off to the energy discharge device 82 via the energy discharge cable 84 which is adapted to connect directly to the power discharge port 86.

A vehicle battery safety sensor system 10 including a safety module 24 of the present disclosure offers several advantages. These include the provision of multiple different types of sensors directly in or supported on the frame 16 of the battery pack 12, each communicating with the safety module 24 to centrally collect any sensor output signals. The sensors provide indication of the condition of the battery pack 12 both to the vehicle operator such as to a center stack or to a speedometer gage cluster, and to parties passing the vehicle 14 and to a first responder if the vehicle 14 is in an accident or is stranded. The safety module 24 of the present disclosure provides a unified collector for all of the sensor output signals for subsequent communication with the vehicle ECU.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A battery pack safety system for a battery powered vehicle, comprising:
   a safety module in communication with a vehicle battery pack holding an electrical charge;
   at least one battery pack sensor in communication with the safety module; and
   a warning module in communication with the safety module, the warning module, when initiated by a signal from the safety module in response to an output signal from the at least one battery pack sensor, energizing a signaling device providing external vehicle indication of a status of the battery pack, and
   wherein the battery pack includes a frame mounted to the vehicle, the at least one battery pack sensor supported by the frame, wherein the frame includes a low point for gravity collection of a fluid, and wherein the low point is formed in a bottom wall of the frame of the battery pack, and the frame includes an inside wall surface disposed on a side wall of the frame, and
   wherein the at least one battery pack sensor defines a smoke sensor attached to the inside wall surface and spaced above the bottom wall.

2. The battery pack safety system for a battery powered vehicle of claim 1, wherein the smoke sensor is disposed in an inner corner of the frame.

3. The battery pack safety system for a battery powered vehicle of claim 1, wherein the frame includes multiple bays each containing a battery cell, each of the bays having a low point for gravity collection of a fluid; and further comprising moisture sensors each located at the low point of one of the multiple bays.

4. The battery pack safety system for a battery powered vehicle of claim 1, wherein the bottom wall of the frame of the battery pack is concavely curved or arched downward toward the low point.

5. The battery pack safety system for a battery powered vehicle of claim 1, wherein the frame includes cross beams and wherein the low point is located below portions of the bottom wall that connect to the cross beams of the frame.

6. A battery pack safety system for a battery powered vehicle, comprising:
   a frame having four side walls connected to a bottom wall;
   a plurality of cross beams extending from two of the four side walls to define battery bays for storing batteries;
   a safety module in communication with a vehicle battery pack holding an electrical charge;
   at least one battery pack impact sensor in communication with the safety module, the battery pack impact sensor disposed on one of the four side walls; and
   a warning module in communication with the safety module, the warning module, when initiated by a signal from the safety module in response to an output signal from the at least one battery pack impact sensor, energizing a signaling device providing external vehicle indication of a status of the battery pack.

7. A battery pack safety system for a battery powered vehicle, comprising:
   a frame having a front wall, a rear wall, and two side walls connected to a bottom wall;
   a plurality of cross beams extending from inside surfaces of the two side walls to define battery bays;
   a safety module in communication with vehicle battery packs disposed in the battery bays, the safety module disposed on an outside surface the rear wall of the frame;
   at least one battery pack accelerometer in communication with the safety module, the battery pack accelerometer disposed within one of the battery bays; and
   a warning module in communication with the safety module, the warning module, when initiated by a signal from the safety module in response to an output signal from the at least one battery pack accelerometer, energizing a signaling device providing external vehicle indication of a status of the battery pack.

\* \* \* \* \*